United States Patent [19]
Golin

[11] Patent Number: 5,265,180
[45] Date of Patent: Nov. 23, 1993

[54] METHOD OF ENCODING A SEQUENCE OF IMAGES OF A DIGITAL MOTION VIDEO SIGNAL

[75] Inventor: Stuart J. Golin, East Windsor, N.J.

[73] Assignee: Intel Corporation, Santa Clara, Calif.

[21] Appl. No.: 15,286

[22] Filed: Feb. 8, 1993

Related U.S. Application Data

[63] Continuation of Ser. No. 714,863, Jun. 13, 1991, abandoned.

[51] Int. Cl.⁵ .......................... G06K 9/46; H04N 7/12
[52] U.S. Cl. ....................................... 382/56; 358/133; 358/136
[58] Field of Search .................. 382/56; 358/105, 133, 358/135, 136, 137, 430, 432

[56] References Cited

U.S. PATENT DOCUMENTS

| | | | |
|---|---|---|---|
| 4,217,609 | 8/1990 | Hatori et al. | 358/136 |
| 4,546,386 | 10/1985 | Matsumoto et al. | 358/136 |
| 4,667,233 | 5/1987 | Furukawa | 358/136 |
| 4,689,673 | 8/1987 | Ohki et al. | 358/136 |
| 4,698,672 | 10/1987 | Chen et al. | 358/136 |
| 4,703,350 | 10/1987 | Hinman | 358/133 |
| 4,794,455 | 12/1988 | Erricsson | 358/135 |
| 4,868,653 | 9/1989 | Golin et al. | 358/133 |
| 4,878,230 | 10/1989 | Murakami et al. | 375/27 |
| 4,931,879 | 6/1990 | Koga et al. | 358/335 |
| 5,122,873 | 6/1992 | Golin | 358/133 |
| 5,129,011 | 7/1992 | Nishikawa et al. | 382/9 |

FOREIGN PATENT DOCUMENTS

| | | |
|---|---|---|
| 0288963 | 11/1988 | European Pat. Off. |
| 0424060 | 4/1991 | European Pat. Off. |
| 0444918 | 9/1991 | European Pat. Off. |
| 0493136 | 7/1992 | European Pat. Off. |
| 2003001 | 2/1979 | United Kingdom |
| 2128847 | 5/1984 | United Kingdom |

Primary Examiner—David K. Moore
Assistant Examiner—Andrew W. Johns
Attorney, Agent, or Firm—Carl L. Silverman; James J. Jacobson; William H. Murray

[57] ABSTRACT

In a method of encoding a sequence of images of a digital motion video signal, information regarding future images in the image sequence is obtained by making an initial analysis of the image data before compression. The initial analysis provides information to the compression system regarding variations in complexity between images. This information is used to determine the setting of a compression controller. From this setting, other compression system thresholds and quantizers are scaled. In addition, the initial analysis provides qualitative information regarding events such as scene changes, brief periods of rapid motion, dissolves, wipes, and the appearance of a single anomalous image.

11 Claims, 3 Drawing Sheets

METHOD OF ENCODING A SEQUENCE OF IMAGES OF A DIGITAL MOTION VIDEO SIGNAL

This is a continuation of copending application Ser. No. 07/714,863 filed on Jun. 13, 1991.

FIELD OF THE INVENTION

This invention relates to video signal processing generally and particularly to methods and systems for allocating resources when encoding a full motion digital video signal.

BACKGROUND OF THE INVENTION

The need for reducing the amount of data required to reproduce still and full motion color video images has been recognized. For example, the invention disclosed in U.S. Pat. No. 4,868,653, assigned to the assignee of the present application, is directed to meeting the need for a compression system for providing a compressed digital video signal representative of a full motion color video signal, which is suitable for recording or transmission using relatively narrow band media and which may be decompressed at speeds at least equal to conventional video frame rates.

Ideally such compression techniques read a sequence and produce a bitstream that satisfies the bit rate and decode time constraints. The compression system can adjust to gradually changing image complexity and to abrupt scene changes. However, images often break up during periods of rapid motion. This is because the automated system reacts to increased image complexity by loosening tolerances. This causes image quality to deteriorate, but has been deemed necessary to control the bit rate. It was subsequently determined that such is not always necessary; and, by inclusion of a sophisticated buffering scheme, such a system would be able to ride out a temporary bit-rate overload.

Unfortunately, the compression system does not know whether the overload is temporary until it is too late. Therefore, it does not know whether to react slowly or rapidly to the overload. If it reacts too slowly to a major increase in image complexity, a serious overload will develop. On the other hand, if the system reacts too quickly, the resulting difficult scenes are of poor quality. In addition, an instability is possible where the tolerances oscillate long after the image complexity has stabilized.

SUMMARY OF THE INVENTION

The present invention is directed to providing a method and system for compressing digital video signals which helps control the fluctuation in the bit rate and enhances response to transients in image complexity. Complexity is defined as a measure of the difficulty of compressing an image; that is, the number of bits necessary to obtain acceptable image quality. In the present invention, one exemplary measure of complexity is the mean-square-difference between adjacent images, after motion compensation. Another exemplary measure of complexity is the mean square value of a target image. In accordance with one aspect of the invention, information regarding future images in an image sequence is obtained by making an initial analysis of the image data before compression. Such initial analysis provides information to the compression system regarding variations in complexity between images that is used to determine the setting of a compression controller, and from which setting other compression system thresholds and quantizers are scaled. Furthermore, such initial analysis provides qualitative information regarding events such as scene changes, brief periods of rapid motion, dissolves, wipes, and the appearance of a single anomalous image. Additional information, such as average illumination, is useful in the calculation of complexity.

BRIEF DESCRIPTION OF THE DRAWINGS

The foregoing and further features are shown in the accompanying drawing in which.

DETAILED DESCRIPTION OF THE PREFERRED EMBODIMENT

Figure 1:
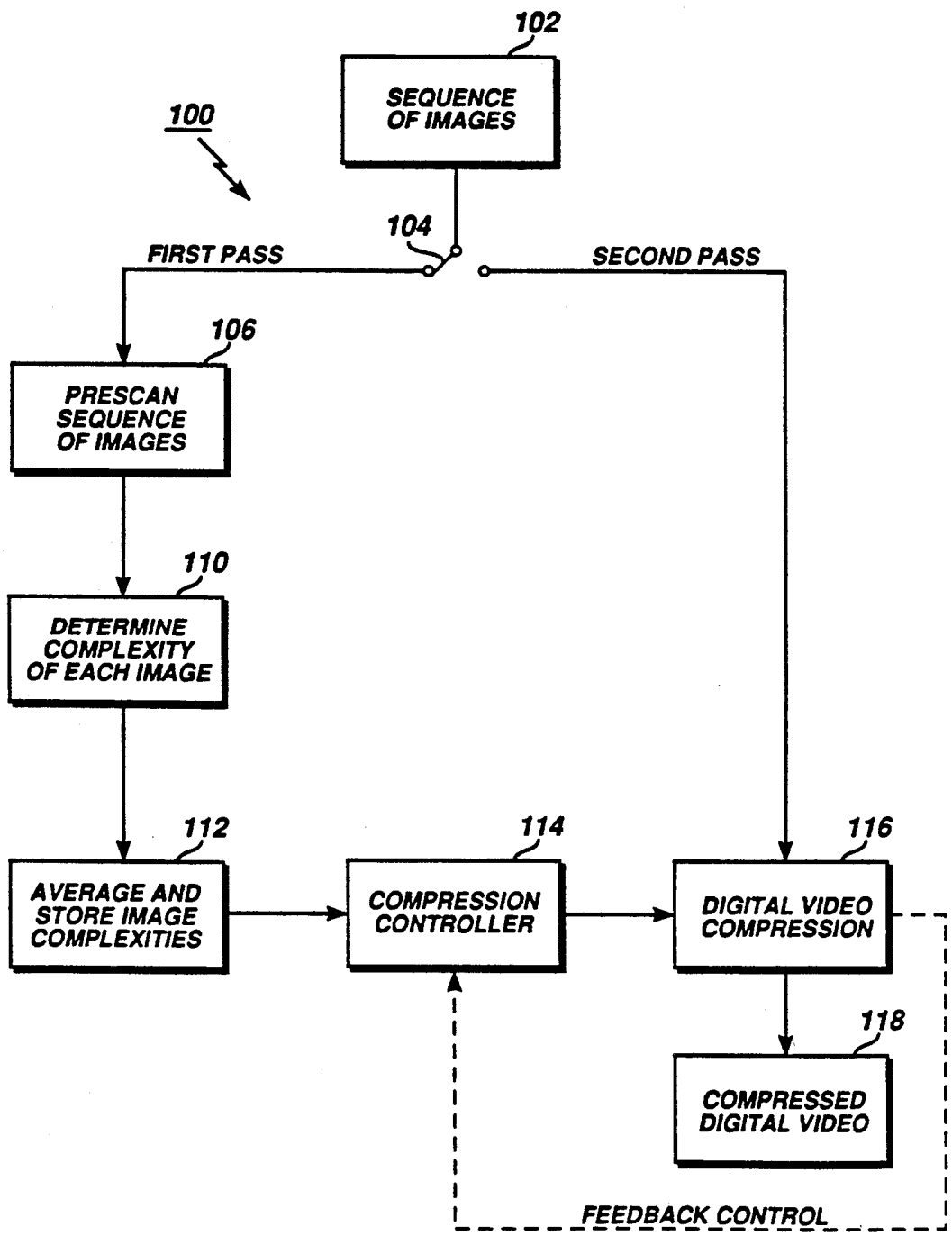
FIG. 1 is a block diagram of a method of automating video compression in accordance with the present invention.

The present invention makes use of future information which is obtained by making a pass over the digital video data before compression. There are many uses of this information. For example, the compression system may decide not to use too many bits on an image if it knows that the next image belongs to a new scene. An important piece of information which is reported to the compression system is the complexity. Complexity is a measure of the difficulty of compressing an image; for example the number of bits necessary to obtain acceptable image quality. The output of a typical compression system feeds into a channel with a fixed capacity, which constrains the average number of bits used to encode an image. In general the number of bits used to encode an image will increase with complexity and decrease with thresholds and quantization. Accordingly, when the compression system observes that the number of bits required to encode images is increasing, it is likely to increase thresholds and/or quantization levels to bring the bit rate back down. However, this is not always the correct response.

For example, assume that the bit rate increase is caused by a few images of fast motion. If these frames are encoded with the same number of bits as the others, they are likely to exhibit poor visual quality. Overall quality will be improved if these images are given extra bits, even at the expense of other images. On the other hand, if the increase in bit rate is caused by the sequence entering a new and more difficult phase, then the compression system must react quickly. Otherwise the compression buffers will be overloaded. The system can decide between these two actions if it has advance information.

The following formula shows how advance information can be used to control the bit rate:

$$T[n+1] = T[n]^* (C[n+1]/C[n])^*(1 + k^*(b[n]-R))$$

Where $T[n+1]$ is the setting of the compression controller used when compressing image $n+1$, after image $n$ has been compressed with compression controller setting $T[n]$. From the setting T, quantization and various thresholds can be scaled. For example, if the setting of the compression controller is increased, the coarseness of the quantizers would be increased. If T has units of mean-square-error, as in the preferred embodiment of the present invention, then quantization would scale as the square root of T.

R is the target bit rate and b[n] is the bit rate of image n. Alternatively, b[n] is a weighted average of the bit rate of image n and a few earlier images. k is an adjustable parameter which determines the restoration force. C[n] is the complexity of image n, calculated from the initial analysis of the sequence. Alternatively, C[n] is a weighted average of the complexities of image n and a few images before and after n. A preferred measure of C is the displaced-frame-difference; that is, the mean-square-error resulting from using the motion-compensated previous image without correction. It should be noted that the above formula reduces to simple proportional control if the C's are set to one.

The averaging of b prevents the system from overreacting to discontinuities in the bit rate, which might be caused by 3:2 pulldown, or the triggering of the threshold. The averaging of C prevents the system from overreacting to a short period of rapid motion, but ensures that it will adequately respond to changing sequence characteristics. In general, if the average is over many images, the system will be able to ride out fairly long periods of rapid motion, but large buffers will be required.

In the present invention, the compression system will know what is happening in the future. The system can predict the future since compression is not performed in real time. Previous systems lacked the ability to determine whether an increase in bit rate was transient or part of a new sequence or something in between. Those systems accommodated increases in bit rate by increasing thresholds. Inclusion of sophisticated buffering could also ameliorate the problem.

The present invention utilizes complexity to optimize image quality while controlling the bit rate. In a preferred embodiment complexity is determined by approximately calculating motion vectors between subsequent images. The calculated motion vectors are applied to get prediction errors. For example, the image n−1 to image n motion vectors are calculated. These calculated motion vectors are then applied to image n−1 which should result in image n. In other words, the calculated vectors produce image n based upon image n−1. The prediction error is the difference between image n and the image resulting from the application of the calculated motion vectors to image n−1. This prediction error is sometimes called the difference image. In the prepass, the vectors are applied to the previous original image. During compression, the decoder has no access to original images; therefore, it applies motion vectors to the last image it decoded. Although the image n−1 to image n motion vectors could be calculated at full image resolution, it is preferred that such calculations are made at a resolution level lower than full resolution. This will speed up the formation of the difference images without an appreciable loss in effectiveness.

In an alternate preferred embodiment, complexity is determined by calculating the mean square value of a target image. This type of determination is useful where each image in a sequence is treated like a still image. This type of determination is also useful when applied to the first image and/or selected images in a motion sequence. In such a case, the complexities associated with the remainder of the images can be that determined from the difference images as described above.

Referring now to FIG. 1, there is shown a block diagram of a preferred embodiment of the method, generally designated 100, of automating digital video compression in accordance with the present invention. A prepass, or first pass is made over a sequence of images 102 from a sequence of frames of a digital motion video signal. The first pass is schematically represented in FIG. 1 by means of a switch 104 which is shown in the first pass position.

During the first pass, the sequence of images is prescanned 106 in order to determine the complexity of 110 of each image in the sequence. The details of preferred embodiments of prescanning 106 and determining image complexities 110 will be subsequently described with respect to FIGS. 2 and 3. In the preferred embodiment depicted in FIG. 2, the measure of complexity is the mean square value of the difference image as will be subsequently described. In the alternate preferred embodiment depicted in FIG. 3, the measure of complexity is the mean square value of a target image as will be subsequently described. Once determined, weighted averages of the image complexities are determined as will also be subsequently described. The weighted average is preferably determined in accordance with the following equation:

$$C_n = \frac{1-r}{1+r} [M_n + r(M_{n-1} + M_{n+1}) + r^2(M_{n-2} + M_{n+2}) + \ldots]$$

Where $C_n$ is the average complexity of image n in the sequence of images; $M_n$ is the mean square value of difference image n; $M_{n-1}$ is the mean square value of the difference image preceding image n; $M_{n+1}$ is the mean square value of the difference image subsequent to image n, etc.; and $1 > r \geq 0$. In general, when r is close to one the averaging effectively includes lots of images. This will cause a large sharing of bits and require large buffers. The weighted averages are used to set a compression controller 114, from which setting all other compression system thresholds and quantizers are scaled during a second, video signal compression pass through the sequence of images.

After the first pass has been completed, the second pass through the sequence of images takes place. This second pass is schematically represented in FIG. 1 by placing switch 104 in the second pass position. During the second pass, the digital video signal will be compressed 116 to form a compressed digital video signal 118. Compression of the digital video signal may be accomplished by any method known to those skilled in the art which utilizes threshold or quantization control for maintaining the bit rate of the compressed signal. In the preferred embodiment, such a system can be, for example, the system described in commonly owned U.S. Pat. No. 5,122,873 the full text of which is incorporated into this detailed description by reference as if fully set forth herein. Another exemplary system which is usable in connection with the present application is described in commonly owned U.S. Pat. No. 4,868,653 which patent is incorporated in its entirety into this detailed description by reference as if fully set forth herein.

As shown in FIG. 1, compression controller 114 utilizes the weighted averages of the image complexities determined in the first pass to scale the compression system thresholds and quantizers. By scaling the thresholds and quantizers the compression system controls the bit rate of the compressed digital video signal in a manner, for example, such as that described in U.S. Pat. No. 4,868,653 which patent has been incorporated by reference into this detailed description. The dashed lines are used to signify a feedback control path over which the bit rate is fed back to the compression controller 114 from the digital video compression system 116.

Figure 2:
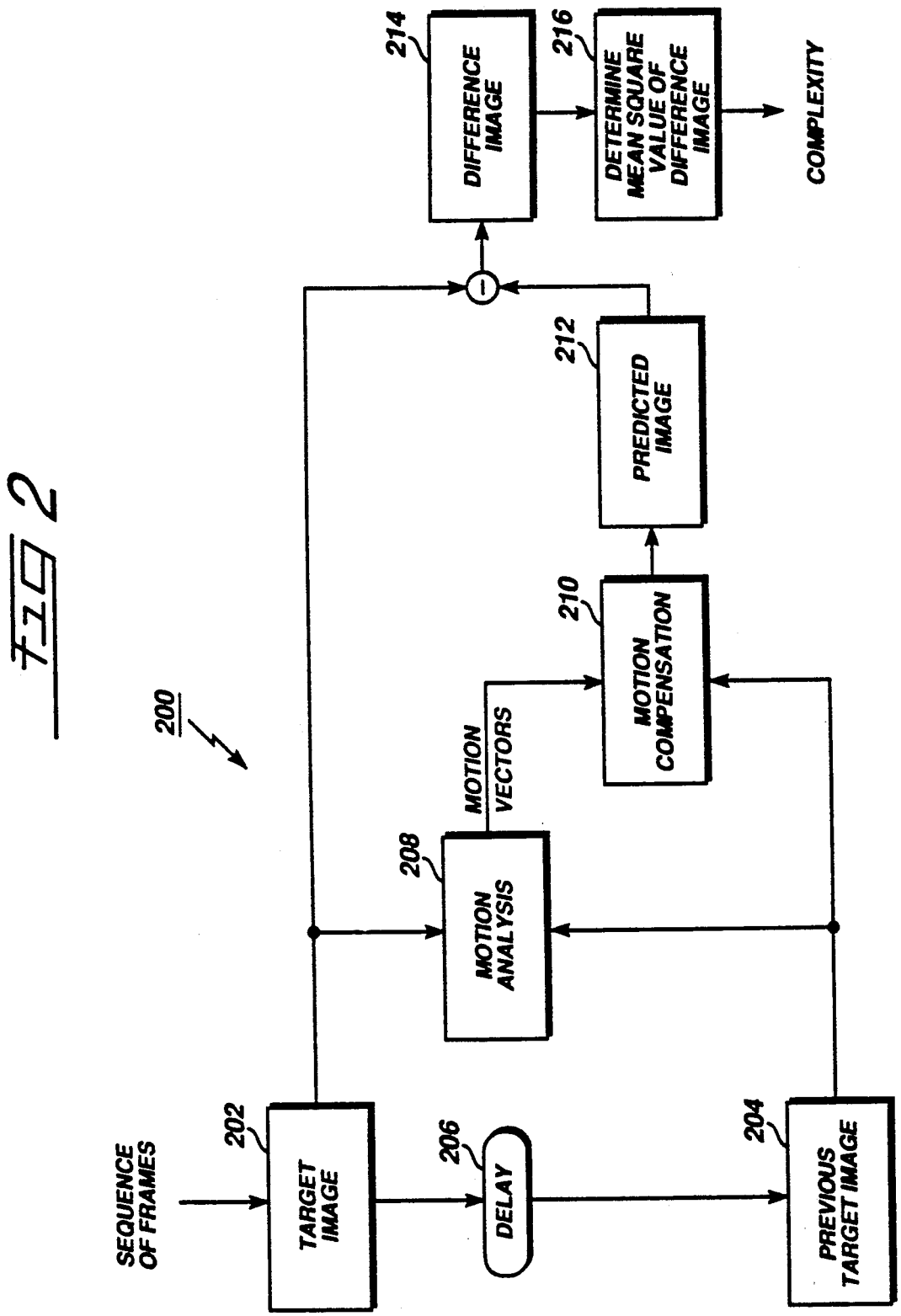
FIG. 2 is a block diagram of a method of performing motion analysis for determining difference images and complexities based thereon in accordance with a preferred embodiment of the present invention.

Referring now to FIG. 2, there is shown a block diagram of a preferred embodiment of a method of obtaining complexity values. In this preferred embodiment, the complexity values are the mean square differences between adjacent images in the sequence of images; or, as shown in FIG. 2, the mean square values of difference images. The method, generally designated 200, comprises the steps of selecting a target image 202 from a sequence of frames of a digital motion video signal. The target image 202 is an image, other than the first image in the sequence. Since the target image 202 is not the first image in the sequence, a previous target image 204 is provided. The previous target image 204 is the image which immediately precedes the target image 202 in the sequence of images. In the block diagram of FIG. 2, this is represented by the delay 206. This delay is accomplished by storing the target image 202 in a first memory device for a predetermined period of time, preferably one frame period, whereby the target image becomes the previous target image for the purposes of motion analysis 208. In the case of a full motion color video signal which is displayed at the rate of 30 frames per second, the delay 206 represents a delay of 1/30th of a second.

In the motion analysis 208, displacement vectors are determined by determining the direction and magnitude of motion of pixels in the target image 202 with respect to corresponding pixels in the previous target image 204. If no motion has occurred, the previous and present pixels will have the same coordinates within the image frame. If motion has occurred, at least some pixels in the previous target image will be offset or translated relative to the corresponding pixels in the present target image by amounts and directions which are represented by displacement vectors. The determination of displacement vectors can be performed, for example, in accordance with the procedure set forth in the U.S. Pat. No. 5,122,873 the full text of which is incorporated into this detailed description by reference as if fully set forth herein; or in accordance with the procedure set forth in U.S. Pat. No. 4,868,653, the full text of which has been incorporated into this detailed description by reference. It should be noted that the use of such procedures is exemplary and that other procedures for motion analysis known to those skilled in the art may also be used.

The displacement vectors resulting from the motion analysis 208 are used in performing motion compensation 210. In motion compensation 210, the displacement vectors from the motion analysis 208 are applied to the previous target image 204 to form a predicted image 212. That is, the displacement vectors are applied to the locations of pixels as they exist in the previous target image 204 to determine the locations of corresponding pixels in the predicted image 212. If the value of a displacement vector is not an integer number of pixels, then the pixel values for that vector are calculated by interpolation, preferably linear interpolation. The pixel values of the predicted image 212 are subtracted from corresponding pixel values in the target image 202 to form a difference image 214. The mean square value of the difference image is then determined 216 to obtain complexity values as will be subsequently described.

As previously stated, complexity C[n] is a measure of the difficulty of compressing image n. In the preferred embodiment, the mean square value of the difference image is used as the measure of complexity. Accordingly, the mean square value (power) of each difference image 214 is determined 216 using the expression:

$$\text{power} = \frac{\Sigma e_{ij}^2}{n}$$

where $e_{ij}$ is equal to the magnitude of the pixel value in location i, j in the difference image 214 and n is equal to the number of pixels in the difference image 214.

Figure 3:
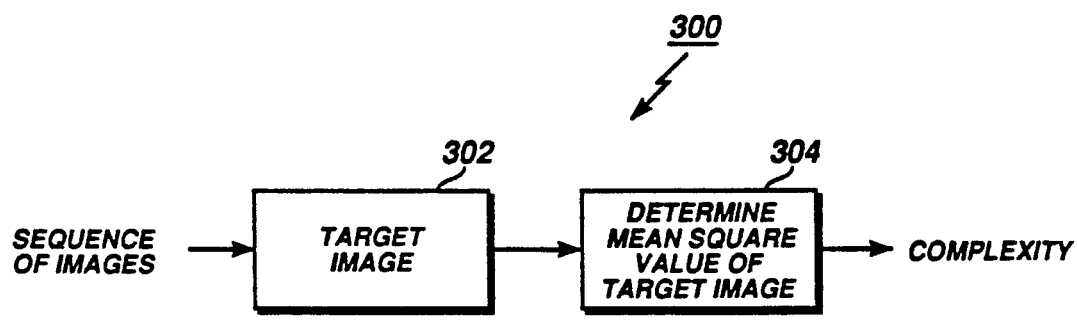
FIG. 3 is a block diagram of a method of determining complexities associated with target images treated as stills.

Referring now to FIG. 3, there is shown a block diagram of a alternate preferred embodiment of a method of obtaining complexity values. In this alternate embodiment, the complexity value is the mean square value of a target image. The method, generally designated 300, comprises the step of selecting a target image 302 from a sequence of frames of a digital motion video signal. The target image can be the first image in a sequence of images, the first image in a scene change, or any other image selected from the sequence of images. In this embodiment, the mean square value of the target image is used as the measure of complexity. Accordingly, the mean square value (power) of the target image 302 is determined as previously described with respect to the determination 216 of the mean square value of each difference image 214 described above with reference to FIG. 2.

It is preferred that C[n] comprise the weighted average of the complexities of image n and a selected number of images before and after image n as previously described. Once determined, the average complexity C[n] for image n is used to control the bit rate through adjusting the threshold as previously described. The threshold is adjusted as a function of the quantity T[n+1] which is determined in accordance with the formula previously set forth. That formula, without the feedback term, is:

$$T[n+1] = T[n]*C[n+1]/C[n]$$

Defining
k=T[0]/C[0], then
T[1]=T[0]*C[1]/C[0]=k*C[1]
T[2]=T[1]*C[2]/C[1]=k*C[2]
etc Therefore, T[n]=k*C[n]=C[n]* T[O]/C[O] and the threshold is proportional to the complexity.

Without the use of complexity, all control is provided by the feedback loop. The feedback must be fairly strong to allow for the worst case; that is, if the sequence suddenly enters a difficult phase, the compressed images will require more bits for encoding until the threshold is increased sufficiently to contain the increased complexity. If the sudden increase in complexity is a temporary blip, the compression program, ignorant of this fact, will still have to react quickly with a large increase in threshold. Since this reaction is not instantaneous, this blip in complexity will use extra bits. However, this increase in the number of bits will be limited by the quick response. Also, since this blip was not foreseen, the number of bits preceding the blip will not be reduced.

The use of complexity enables a reduction in the strength of the feedback. This is because in the present invention the complexity predicts the threshold needed to keep the bit rate constant. Feedback is then needed only to correct the prediction error. The above formula assumes that the prediction is perfect and ignores feedback. If the complexity is not averaged, then all images will use the same number of bits, and there is no redistribution. However, the average complexity, and hence the threshold, will begin to rise before the blip, and begin to return to normal only after the blip. At the blip itself, the average complexity will be smaller than the instantaneous complexity, and hence the threshold Will be smaller than it would be without averaging. As a result, the number of bits used for the blip will be increased.

Complexity does not have to be determined with high accuracy in order to predict trends. For example, as shown in FIG. 2, the difference image 214 is formed using a predicted image resulting from motion compensation which is based upon the previous target image and not based upon the previous reconstructed target image which is typically used to increase the accuracy of the difference image. Furthermore, it is preferred that motion analysis 208 is performed at a lower level of resolution than full resolution. Use of a lower level of resolution speeds up the process and is described in U.S. Pat. No. 4,868,653 which has been incorporated by reference into this detailed description.

If there is a large change in illumination between adjacent frames, as occurs in fades, the complexity as defined above will exaggerate the difficulty in compression. This is because it requires only a few bits to instruct the decoder to increase every pixel value by say, 10 gray levels, or by, say 5%. Therefore, the differences in overall illumination should be eliminated before the complexity is calculated.

In addition to quantitative information, complexity provides valuable qualitative information. For example, it is important for the encoder to distinguish a simple scene change from a dissolve. A dissolve is a scene change in which the two scenes coexist for one or more frames. A simple scene change can usually be identified by its large complexity. However, each frame in a dissolve of a few frames is likely to have a large complexity, and each one can be misinterpreted as the start of a new scene. Other sequence features can also cause this misinterpretation, such as a brief period of rapid motion.

Typically, the first frame of a new scene is encoded as a still, which usually requires a lot more bits than a difference image. This jump in bit rate can be tolerated if scene changes are rare, but can be very serious if each frame in the dissolve is encoded as a still. Since the first frame of a new scene and the first frame of a dissolve can both have high complexities, the complexity of that first frame is insufficient to distinguish the two cases. Rather it is necessary to look ahead. The distinguishing feature of a simple scene change is that the sudden increase lasts a single frame. The complexity of the first frame of a new scene is much larger than the complexities of the preceding frames, as well as of the subsequent frames.

I claim:

1. A method of encoding a sequence of images of a digital motion video signal, said method comprising the steps of:

a performing a preliminary analysis of the entire sequence of images to determine complexity values, each complexity value being associated with at least one of said images and, after completion of said preliminary analysis;

b compressing the images of said sequence of images using a compression system including a compression controller having adjustable settings for scaling compression system quantizers and thresholds; and c adjusting the compression controller setting for each image being compressed in accordance with adjustment parameters including at least one complexity value associated with an image occurring in the sequence subsequent to the image being compressed.

2. The method in accordance with claim 1 wherein step a comprises the steps of:

i selecting at least one image from said sequence of images as a target image; and ii determining, as the complexity value associated with said target image, the mean square value of said target image.

3. The method in accordance with claim 2 wherein step c comprises the steps of:

i determining the average value of the complexity values associated with the target image being compressed and at least one target image occurring in the sequence subsequent to the target image being compressed; and ii using said average value to adjust said compression controller setting for the target image being compressed.

4. The method in accordance with claim 3 wherein said average value also includes the complexity value associated with at least one target image occurring in the sequence of images prior to the target image being compressed.

5. The method in accordance with claim 1 wherein step a comprises the steps of:

i selecting an image from said sequence of images as a first target image;

ii forming a previous target image by storing said first target image in storage means;

iii selecting an image occurring in said sequence of images subsequent to said first target image as a target image;

iv providing at least one displacement vector representing the magnitude and direction of the displacement between at least one region in said target image and a corresponding region in said previous target image;

v applying each displacement vector to a corresponding region in said previous target image to form a predicted image;

vi subtracting pixel values in the predicted image from corresponding pixel values in said target image to form a difference image; and viii determining, as the complexity value associated with said target image, the mean square value of said difference image.

6. The method in accordance with claim 5 wherein step c comprises the steps of:

i determining the average value of the complexity values associated with the target image being compressed and at least one target image occurring in the sequence subsequent to the target image being compressed; and ii using said average value to adjust the compression controller setting for the target image being compressed.

7. The method in accordance with claim 6 wherein said average value also includes the complexity value associated with at least one target image occurring in the sequence prior to the target image being compressed.

8. The method in accordance with claim 5 wherein said target image and said previous target image are each resolved into a level of resolution lower than full resolution and wherein steps iv through vii are performed at said lower level of resolution.

9. The method in accordance with claim 5 comprising the additional step of subtracting a constant quantity from the previous target image so that the target image and the previous target image have the same mean value.

10. A method of encoding a sequence of images of a digital motion video signal, said method comprising the steps of:

a performing a preliminary analysis of the entire sequence of images to determine complexity values, each complexity value being associated with at least one of said images and, after completion of said preliminary analysis;

b analyzing said complexity values to locate the first image in a scene change; and c encoding said first image differently from images occurring in said sequence subsequent to said first image.

11. The method in accordance with claim 10 wherein step b comprises the steps of:

i locating an image having a substantial increase in complexity associated therewith compared to the complexity of at least one preceding image;

ii analyzing the complexity of at least one image subsequent to said located image and, if the complexity of said subsequent image is substantially lower than the complexity of said located image, identifying said located image as the first image in a scene change.

* * * * *